Dec. 1, 1942.  A. RAFTER  2,303,760
MACHINE FOR CUTTING SHEET METAL
Filed Aug. 27, 1941  2 Sheets-Sheet 1

INVENTOR
Albert Rafter,
BY Fredk. C. Fischer
ATTORNEY

Dec. 1, 1942.　　　　A. RAFTER　　　　2,303,760
MACHINE FOR CUTTING SHEET METAL
Filed Aug. 27, 1941　　　　2 Sheets-Sheet 2

INVENTOR
Albert Rafter,
BY Frank C. Fischer
ATTORNEY

Patented Dec. 1, 1942

2,303,760

UNITED STATES PATENT OFFICE 2,303,760

MACHINE FOR CUTTING SHEET METAL

Albert Rafter, Glen Ridge, N. J., assignor to Rafter Machine Company, Belleville, N. J., a partnership composed of Albert Rafter and John C. Rafter, Jr.

Application August 27, 1941, Serial No. 408,435

9 Claims. (Cl. 164—47)

This invention relates to machines for cutting sheet metal, such as squaring shears, and more particularly to the provision of means for insuring the proper positioning of the shearing knives used in such machines.

In machines for shearing metal sheets, it is necessary to apply a great force and should the shearing knife carried by the movable ram of the machine be not properly positioned with relation to the shearing knife carried by the stationary bed of the machine, an improper cut would be made, and there is a possibility of seriously damaging the shearing knives.

An object of this invention is the provision of means for adjusting a ram in a metal cutting machine in order to control the length of the cut, to enable the machine to be used for continuous cutting.

It is a further object of this invention to provide in a machine for shearing metal sheets, a cutting knife bolted solidly to a movable ram without any adjustment between the knife and the ram, the movable ram having means to pull it and maintain it firmly against stationary guides at all times, which are carried by the housing of the machine, thus insuring the proper positioning of the knife carried by the ram.

The adjustment is accomplished by sliding the lower knife table toward the upper knife. After the adjustment is made the bottom table is bolted firmly to the housing. It will be noted that the knife adjustment is accomplished without any springs or resilient means between the upper knife carried by the ram and the lower knife carried by the table.

A further object is the provision of means in a metal cutting machine, to substantially insure a straight line motion of the movable ram carrying a cutting knife, by the provision of a bar, one end of which is pivotally connected to the ram and the other end of the bar being connected to a lever, which lever in turn is connected to the housing of the machine. One end of the lever is connected with a spring secured to the machine housing solely for the purpose of urging the bar backward, which will cause a thrust of the ram firmly against the stationary guides on the housing.

The bar is connected in approximately the center of the depth of the ram with the result that any pressure exerted through the spring urges a slight pressure in the center of the height of the ram, thus keeping both the top and bottom of the ram firmly against it guides without any tipping action or tendency of the bottom or top of the ram to move to or from its guides. Inasmuch as the eccentric strap is not connected directly to the ram, but is connected to the bar which is pivoted to the center of the ram, any tendency of the eccentric strap to move the top of the ram to or from the guides is eliminated.

It will thus be noted that one end of the bar is pivoted to the ram and the other end fastened in such a manner as to permit the bar to float horizontally or at right angles to the ram carrying the knife, which, when spring loaded, or if the pivoted arm is offset a few degrees from a parallel line with the ram, the pressure exerted through the eccentric strap will force the bar toward the rear of the machine, which in turn, forces the ram against the guides on the housing.

In recent tests it has been found that if the connecting link is offset approximately 30 degrees from the parallel line of the ram, the arm will pull the ram against the housing with sufficient force without the aid of a spring.

These and other advantageous objects, which will later appear, are accomplished by the simple and practical construction and arrangement of parts hereinafter described and exhibited in the accompanying drawings, forming part hereof, and in which:

Fig. 4 is a plan view of a ram actuating means used in the machine,

Fig. 5 is a side view of the structure shown in Fig. 4,

Fig. 6 is a side view of a modified form of the ram actuating means, and

Fig. 7 is a front view of the same.

Figure 1:
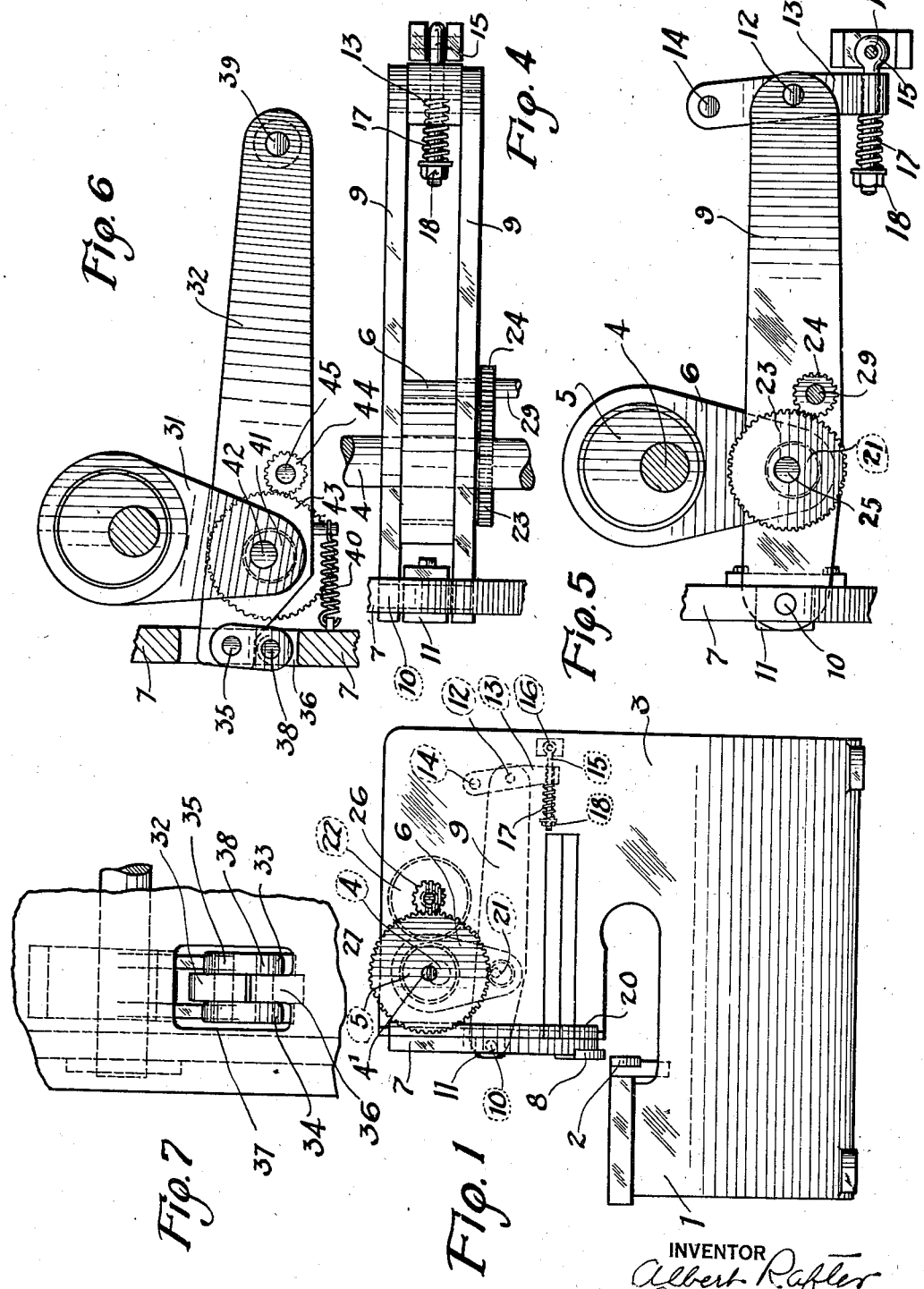
Fig. 1 is a side elevational view of a machine embodying the invention.
Figure 2:
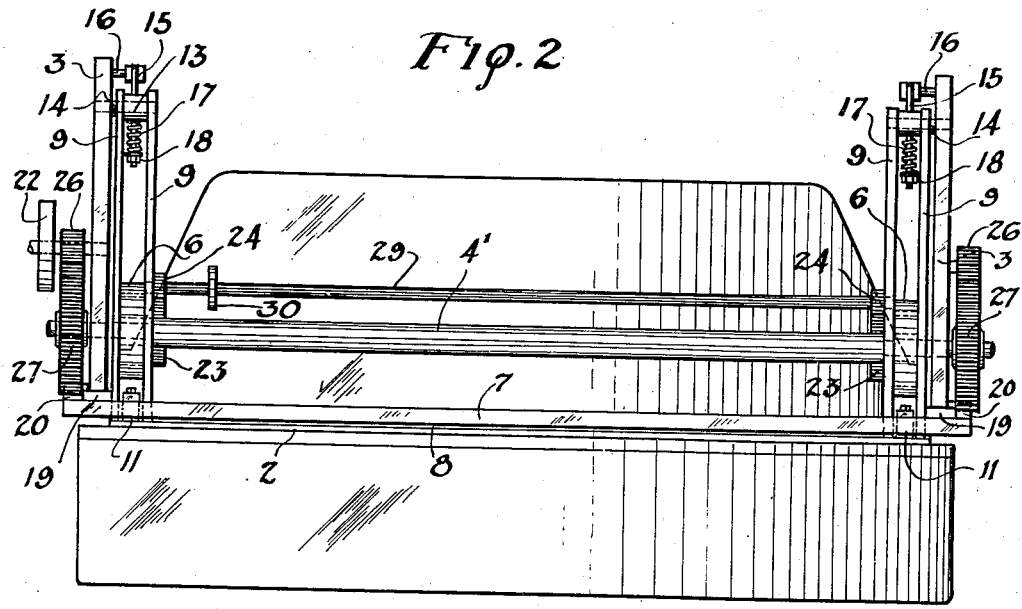
Fig. 2 is a plan view of the machine.
Figure 3:
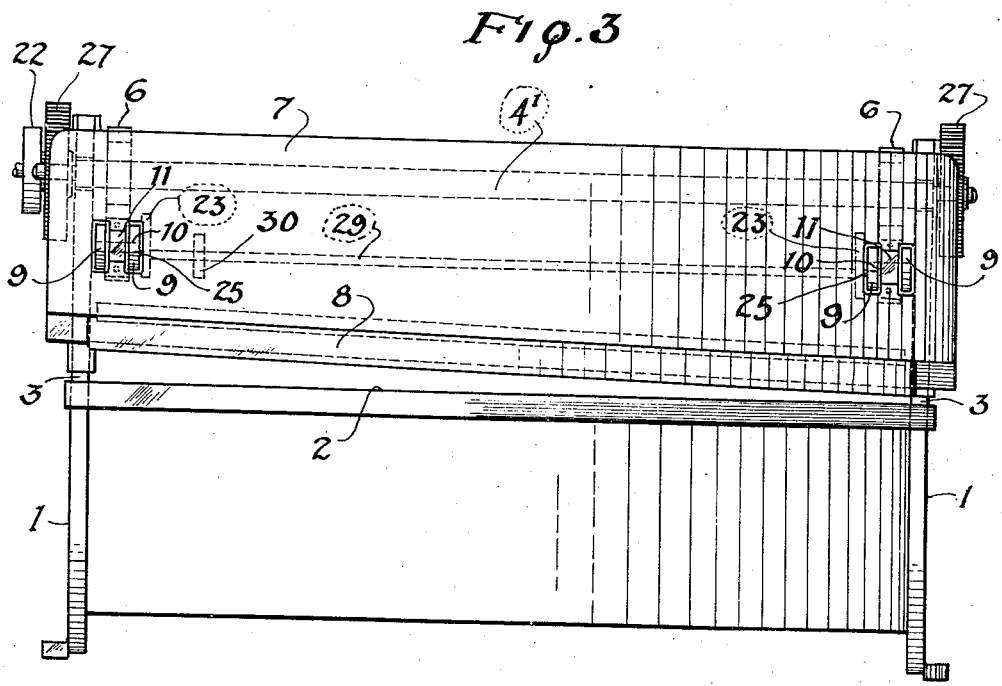
Fig. 3 is a front elevational view of the machine.

Referring to the drawings, in Fig. 1 there is shown a machine for cutting metal sheets, the machine having a bed 1 in which is mounted a stationary shearing knife 2. Extending up from the bed 1 are side members 3 through which pass a shaft 4 having an eccentric 5, which moves the pitman 6 up and down, to actuate a ram 7, carrying a knife 8. The lower end of the pitman 6 is fixed to a bar 9, which is connected to ram 7 by pins 10. Each end of the ram is provided with an opening in which rests a block 11 having passing therethrough the pins 10 which also pivotally receives the bars 9 (see Fig. 3). The bars 9 are pivotally connected at 12 to an arm 13 pivoted at 14, to the side wall 3. The lower end of the arm 13 is provided with an aperture through which passes a rod 15 which has one end pivotally looped over a bolt 16 to the side wall 3. A compression spring 17 encircles the rod 15 and engages one side of arm 13 and a nut 18 is threaded on to the rod 15. By adjusting the nut 18 the pressure of the spring 17 can be adjusted on arm 13. The spring 17 tends to constantly urge arm 13 towards the rear of the machine and to exert resilient force constantly pulling the ram 7 against the guide gibs 19, the ram carrying a guide 20.

In order to adjust the length of the cut of the knife for continuous cutting there is provided at the lower end of pitman 6 an adjusting eccentric 21 which is fixed to a shaft 25, which has fixed to it a gear 23 in mesh with a pinion 24, fixed to a shaft 29. By rotating the pinion 24 the eccentric 21 can be moved to raise or lower the ram 7 and knife 8 and thus decrease or increase the length of the cut. The pinion 24 can be rotated by a hand wheel 30, or the like.

Shaft 4' has fixed to it a gear 27 which meshes with a pinion 26 driven by a pulley 22. The structure is substantially the same at both ends of the machine.

In the modified form of the ram actuating means shown in Figs. 6 and 7 of the drawings, the lower end of the pitman 31 which corresponds to the pitman 6 heretofore described, is fixed to a bar 32, which is connected to the ram 7 by means of a pair of links 33 and 34, the upper ends of which are pivotally connected to the front end of the bar 32 by means of a pin 35. The lower ends of the links 33 and 34 are pivotally connected to a lug 36 located in an opening 37 formed in the ram by means of a pin 38; the rear end of the bar 32 is pivotally connected at 39 to the side wall or housing 3.

A spiral spring 40 having one end thereof secured to the ram 7 and the other end secured to the bar 32 tends to exert resilient force constantly pulling the ram 7 against the guide gibs 19.

It is of course to be understood, that in order to adjust the length of the cut of the knife for continuous cutting, there is provided at the lower end of the pitman 31 an adjusting eccentric 41 which is fixed to a shaft 42 and which has fixed to it a gear 43 similar to the gear 23 shown in Fig. 5 in mesh with a pinion 44 similar to the pinion 24 fixed to a suitable shaft 45. By rotating the pinion 44 the eccentric 41 can be moved to raise or lower the ram 7 and knife 8 and thus decrease or increase the length of the cut.

Inasmuch as the eccentric strap is not connected directly to the ram, but is connected to the bar which is pivoted to the center of the ram and the other end of the bar fastened in such a manner as to permit the bar to float horizontally or at right angles to the ram carrying the knife, the pressure exerted through the eccentric strap will force the bar toward the rear of the machine, which in turn forces the ram firmly against the guides on the housing.

From the above description it will be seen that there has been provided a device for constantly urging the ram firmly against the guide gibs and insuring a substantially straight line of motion, so that the cutting knives will be properly positioned relatively to each other.

While the actuating members for the ram have been shown to each comprise a pair of bars 9, it is obvious that a single bar (shown in Figs. 6 and 7) may be employed without departing from the spirit of the invention.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. A machine for cutting sheet metal, comprising a bed having a knife mounted thereon, a frame on said bed, a ram, guides for the ram, a second knife mounted on the ram, a bar pivotally connected to said ram, an arm pivotally connected to said bar intermediate its length, one end of said arm being pivoted to said frame and the other end thereof having passing therethrough a pivotally mounted bolt, a compression spring encircling said bolt and exerting a constant pressure on said arm, a pitman connected to said bar, and eccentric means for reciprocating said pitman, said bar urging the ram constantly against the guides in the same direction.

2. A machine for cutting sheet metal, comprising a bed having a knife mounted thereon, a frame on said bed, a ram, guides for the ram, a second knife mounted on the ram, a bar connected to said ram, a pitman connected to the bar, eccentric means to reciprocate said pitman, an arm pivoted to said frame and pivotally connected to one end of the bar, and resilient means associated with said arm to constantly urge said arm to exert a pull upon the bar to hold the ram against said guide.

3. A machine for cutting sheet metal, comprising a bed having a knife mounted thereon, a ram, guides for the ram, a second knife mounted on the ram, a bar pivotally connected to the ram, means to move the bar up and down to reciprocate the ram, means acting on the bar to constantly urge the ram in the same direction against the guides, and eccentric means on said bar for adjusting the height of the ram and controlling the length of the cutting stroke.

4. A machine for cutting sheet metal, comprising a bed having a knife mounted thereon, a frame on said bed, a ram, a second knife mounted on the ram, a bar pivotally connected to the ram at substantially midway the height of the ram, guides for the ram, means to move the bar up and down to reciprocate the ram, and means mounted on said frame and pivotally connected to one end of the bar to constantly exert a force in the same direction on the ram to maintain the ram against said guides at all times.

5. A machine for cutting sheet metal, comprising a bed having a knife mounted thereon, a frame on said bed, a ram, a second knife mounted on the ram, guides for the ram, a bar pivotally connected at one end to the ram, means to move the bar up and down to reciprocate the ram, an arm pivoted to said frame and pivotally connected to one end of the bar, and resilient means constantly urging the arm in one direction to tend to pull the bar to hold the ram firmly against its guide.

6. A machine for cutting sheet metal, comprising a bed having a knife mounted thereon, a frame on said bed, a ram, guides for the ram, a second knife mounted on the ram, a bar pivotally connected to the ram at substantially midway the height of the ram, an arm pivoted to said frame and pivotally connected intermediate its length to said bar, one end of said arm being pivoted, a pitman connected to said bar, and eccentric means for reciprocating said pitman, said bar urging the ram constantly against the guides in the same direction.

7. A machine for cutting sheet metal, comprising a bed having a knife mounted thereon, a frame on said bed, a ram having a knife mounted thereon, guides for the ram, a bar having one end pivotally connected to the ram at substantially mid-way the height of the ram, the other end of the bar being pivotally mounted on said frame, means acting on the bar to constantly urge the ram in the same direction against the guides, a pitman connected to said bar, and eccentric means for reciprocating the pitman.

8. A machine for cutting sheet metal, comprising a bed having a knife mounted thereon, a ram having a knife mounted thereon, guides for the ram, a bar having one end connected to the ram at substantially mid-way the height of the ram, a pitman connected to the bar intermediate the length thereof, eccentric means for reciprocating the pitman, and means associated with the bar to constantly urge the ram against the guides in the same direction.

9. A machine for cutting sheet metal, comprising a bed having a knife mounted thereon, a ram having a second knife mounted thereon, guides for the ram, a link pivotally connected to the ram at substantially mid-way the height of the ram, a substantially horizontal bar pivoted at one end to the link, a pitman connected to the bar intermediate its length, eccentric means for reciprocating the pitman, and means associated with the bar to constantly urge the ram against the guides in the same direction.

ALBERT RAFTER.